United States Patent
Uejima

(10) Patent No.: US 9,602,147 B2
(45) Date of Patent: Mar. 21, 2017

(54) SWITCH MODULE

(71) Applicant: Murata Manufacturing Co., Ltd., Nagaokakyo-shi, Kyoto-fu (JP)

(72) Inventor: Takanori Uejima, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 14/749,308

(22) Filed: Jun. 24, 2015

(65) Prior Publication Data
US 2015/0295595 A1 Oct. 15, 2015

Related U.S. Application Data

(63) Continuation of application No. PCT/JP2013/080380, filed on Nov. 11, 2013.

(30) Foreign Application Priority Data

Dec. 26, 2012 (JP) .................................. 2012-281998

(51) Int. Cl.
| H04B 1/44 | (2006.01) |
|---|---|
| H04B 1/00 | (2006.01) |
| H04B 1/04 | (2006.01) |
| H04B 7/04 | (2006.01) |
| H04B 7/08 | (2006.01) |
| H04B 1/40 | (2015.01) |

(52) U.S. Cl.
CPC ........... *H04B 1/006* (2013.01); *H04B 1/0064* (2013.01); *H04B 1/0458* (2013.01); *H04B 7/04* (2013.01); *H04B 7/0805* (2013.01)

(58) Field of Classification Search
CPC ..... H04W 88/06; H04B 1/006; H04B 1/0053; H04B 1/0064; H04B 1/406
USPC .................................................. 455/78, 553.1
See application file for complete search history.

(56) References Cited

U.S. PATENT DOCUMENTS

| 2009/0206948 A1 | 8/2009 | Kemmochi et al. |
| 2011/0084862 A1 | 4/2011 | Aso |
| 2012/0306716 A1 | 12/2012 | Satake et al. |

FOREIGN PATENT DOCUMENTS

| CN | 1674452 A | 9/2005 |
| JP | 2002-050905 A | 2/2002 |
| JP | 2004-336215 A | 11/2004 |
| JP | 2005-354407 A | 12/2005 |
| JP | 2007-312230 A | 11/2007 |
| JP | 2010-252346 A | 11/2010 |
| JP | 2011-072013 A | 4/2011 |

(Continued)

OTHER PUBLICATIONS

Translation of JP-2005354407, Dec. 22, 3005.*

(Continued)

*Primary Examiner* — Lee Nguyen
(74) *Attorney, Agent, or Firm* — Keating & Bennett, LLP

(57) ABSTRACT

Impedance mismatching by a matching circuit provided on a signal line which connects a first common terminal and a second common terminal is eliminated so as to significantly reduce insertion loss of a switch module. Therefore, it is possible to provide a switch module which has a simple configuration without the need for connection of a matching circuit to antenna terminals to which antennas are respectively connected, and is able to selectively connect any one of the antennas and any one of communication systems.

18 Claims, 10 Drawing Sheets

(56) References Cited

FOREIGN PATENT DOCUMENTS

| JP | 2011-82879 A | 4/2011 |
| JP | 2011-134738 A | 7/2011 |
| WO | 2011/061946 A1 | 5/2011 |

OTHER PUBLICATIONS

Official Communication issued in corresponding Japanese Patent Application No. 2014-554223, mailed on Mar. 15, 2016.
Official Communication issued in International Patent Application No. PCT/JP2013/080380, mailed on Dec. 3, 2013.
Official Communication issued in corresponding Chinese Patent Application No. 201380068408.6, mailed on Dec. 16, 2016.

\* cited by examiner

SWITCH MODULE

BACKGROUND OF THE INVENTION

1. Field of the Invention

The present invention relates to a switch module which selectively connects a plurality of antenna elements and a plurality of communication systems.

2. Description of the Related Art

In recent years, as a mobile communication terminal such as a cellular phone or a mobile information terminal or a communication apparatus such as a wireless LAN terminal, a communication apparatus has been provided and includes a plurality of communication systems performing communications according to different communication standards such as the GSM (Global System for Mobile communications: registered trademark) standard, the W-CDMA (Wideband Code Division Multiple Access) standard, the LTE (Long Term Evolution) standard, and the Bluetooth (registered trademark) standard; and supports communications according to a plurality of communication standards (multi-modes). In addition, in a communication apparatus which supports multi-modes by including a plurality of communication systems, a predetermined frequency band is assigned to each communication system, and communication is performed by using a plurality of frequency bands (multi-bands). Moreover, as a communication apparatus which supports multi-modes as described above, a communication apparatus has also been provided which includes a communication system for receiving a signal from a GPS (Global Positioning System) satellite, in addition to the respective communication systems which perform communication according to the above respective communication standards.

As an existing communication apparatus which supports multi-modes and multi-bands as described above, a communication apparatus has been provided which includes a first communication system performing wireless communication via a wireless LAN using a 5 GHz band standardized as IEEE802.11a; and a second communication system performing wireless communication via a wireless LAN using a 2.4 GHz band standardized as IEEE802.11b (e.g., see Japanese Unexamined Patent Application Publication No. 2010-252346 (paragraphs [0033] to [0053], FIGS. 1 to 3, etc.)). As shown in FIG. 13, a communication apparatus 500 disclosed in Japanese Unexamined Patent Application Publication No. 2010-252346 includes two multi-band antennas 501a and 501b which are able to perform transmission/reception in the 2.4 GHz band and the 5 GHz band; an RF-IC 502 in which a transmitting circuit section which modulates transmission data and a receiving circuit section which demodulates reception data are provided for each communication system; and a switch module 503 (high frequency circuit section) which selectively connects the respective multi-band antennas 501a and 501b and the transmitting circuit section and the receiving circuit section for each communication system provided in the RF-IC 502. In addition, baluns 504a and 504b which convert a balanced signal outputted from each transmitting circuit section into an unbalanced signal are provided between the switch module 503 and the transmitting circuit section for each communication system provided in the RF-IC 502, and power amplifiers 505a and 505b which amplify the unbalanced signal and output the unbalanced signal to the switch module 503 are provided so as to be connected to the subsequent stages of the respective baluns 504a and 504b.

In addition, the switch module 503 is formed of switching elements such as a field effect transistor (FET) and a diode, and includes a DPDT (Double Pole Double Throw) high-frequency switch circuit having first to fourth ports, and a plurality of branching circuits. The multi-band antennas 501a and 501b connected to the first and second ports 503a and 503b, respectively, of the high-frequency switch circuit and the branching circuits connected to the third and fourth ports, respectively, of the high-frequency switch circuit are selectively connected to each other by the high-frequency switch circuit, whereby the multi-band antennas 501a and 501b and the transmitting circuit section and the receiving circuit section for each communication system which are provided in the RF-IC 502 and connected to the respective branching circuits are selectively connected to each other by the switch module 503.

Moreover, in the communication apparatus 500, communication by diversity is executed by using the multi-band antennas 501a and 501b. Specifically, first, before the communication is started, the multi-band antenna 501b and both communication systems are connected to each other by the switch module 503, and frequency scan is performed to search for a frequency channel on which reception is possible (carrier scan), whereby all frequency channels on which reception is possible are detected. Next, the other multi-band antenna 501a and both communication systems are connected to each other via the switch module 503, and frequency scan is performed to search for a frequency channel on which reception is possible, whereby all frequency channels on which reception is possible are detected. Subsequently, a frequency channel for a communication system to be activated is selected on the basis of a result of the frequency scan using both multi-band antennas 501a and 501b. In addition, the signal levels (amplitudes) of reception signals received by both multi-band antennas 501a and 501b are compared to each other, whereby a multi-band antenna to be connected to the transmitting and receiving circuits of the selected communication system is selected from the multi-band antennas 501a and 501b. Then, the selected multi-band antenna and the selected communication system are connected to each other by the switch module 503, and communication using the multi-band antenna and the communication system is executed in the communication apparatus 500.

Meanwhile, in the above-described switch module 503, the multi-band antennas 501a and 501b (antenna elements) are connected to the first and second ports 503a and 503b of the high-frequency switch circuit via matching circuits (not shown), respectively, and impedance is matched between each of the multi-band antennas 501a and 501b and the switch module 503, whereby the insertion loss of the switch module 503 is reduced. However, in this case, since it is necessary to provide the matching circuits for the respective multi-band antennas 501a and 501b connected to the switch module 503, the manufacturing cost of the communication apparatus 500 is increased. Therefore, there is a demand for a switch module which has low insertion loss and does not need a matching circuit between each connected antenna element.

In addition, the above-described switch module 503 is formed such that, in order to reduce transmission loss of a communication signal due to switch units being connected at multiple stages, the number of switch units is reduced and a plurality of branching circuits are connected to one switch unit (high-frequency switch circuit). However, with an increase in the number of communication systems mounted in the communication apparatus 500, the number of branching circuits connected to the switch unit has to be increased, and the number of terminals of the switch unit connected to each branching circuit has to be increased. In this case, with the increase in the number of the terminals of the switch unit and the increase in the number of the branching circuits connected thereto, the insertion loss of the switch module may increase. However, such an increase in the insertion loss of the switch module with an increase in the number of the supported communication standards (modes) has not been sufficiently considered. Therefore, there is a demand for a switch module which is able to reduce insertion loss even when the number of modes supported by the switch module increases and the number of frequency bands (bands) used for communication increases.

SUMMARY OF THE INVENTION

Preferred embodiments of the present invention provide a switch module which has a simple configuration without the need for connection of a matching circuit to a plurality of antenna terminals to each of which an antenna element is connected, but is able to selectively connect a plurality of antenna elements and a plurality of communication systems; and is able to reduce insertion loss.

A switch module according to a preferred embodiment of the present invention includes a first switch unit including a plurality of antenna terminals to which antenna elements are respectively connected, a first common terminal, and a first switch section which selectively connects any one of the plurality of antenna terminals and the first common terminal; a second switch unit including a second common terminal, a plurality of signal terminals to which corresponding communication systems are respectively connected, and a second switch section which selectively connects the second common terminal and any one of the plurality of signal terminals; a signal line which connects the first common terminal and the second common terminal; and a matching circuit provided on the signal line.

The first switch unit to switch between the plurality of antenna elements, and the second switch unit to switch between the plurality of communication systems are individually provided, and the first switch unit and the second switch unit are connected to each other via the single signal line. That is, in the first switch unit which includes the plurality of antenna terminals to which the antenna elements are respectively connected, and the first common terminal, any one of the plurality of antenna terminals and the first common terminal are selectively connected to each other by the first switch section. In addition, in the second switch unit which includes the second common terminal and the plurality of signal terminals to which the corresponding communication system are respectively connected, the second common terminal and any one of the plurality of signal terminals are selectively connected to each other by the second switch section. The antenna element connected to the antenna terminal selectively connected to the first common terminal by the first switch section, and the communication system connected to the signal terminal selectively connected to the second common terminal by the second switch section are connected to each other via the single signal line which connects the first common terminal of the first switch unit and the second common terminal of the second switch unit.

With such a configuration, one antenna element and one communication system are selectively connected to each other by the first switch section and the second switch section regardless of the number of the antenna elements connected to the first switch unit and the number of the communication systems connected to the second switch unit, and thus impedance mismatching between the first common terminal of the first switch unit and the second common terminal of the second switch unit is greatest. However, since it is possible to eliminate the impedance mismatching by the matching circuit provided on the signal line which connects the first switch unit (first common terminal) and the second switch unit (second common terminal), and thus it is possible to reduce the insertion loss of the switch module. Therefore, connection of the matching circuit to the plurality of antenna terminals to which the antenna elements are respectively connected is unnecessary, and it is possible to provide switch module having a simple configuration. In addition, even with the simple configuration in which connection of the matching circuit to each antenna terminal is omitted, it is possible to selectively connect any one of the respective antenna elements connected to the respective antenna terminals of the first switch unit and any one of the respective communication systems connected to the respective signal terminals of the second switch unit, by the first switch section and the second switch section.

In addition, the first switch unit may include a first switch IC, the second switch unit may include a second switch IC, and a wiring board on which the first switch IC, the second switch IC, the signal line, and the matching circuit are provided may be included.

With such a configuration, it is possible to provide a switch module having a practical configuration in which the first switch IC and the second switch IC connected to each other via the single signal line are provided on a wiring board. In addition, it is possible to configure the matching circuit, which is provided on the signal line which connects the first switch IC and the second switch IC, to include a chip component of an inductor, a capacitor, and the like provided on a wiring board, or an inductor, a capacitor, and the like defined by a wiring pattern provided on the wiring board.

In addition, a first power supply terminal provided in the first switch IC, a second power supply terminal provided in the second switch IC, a common power supply electrode provided on the wiring board, and a power supply line provided on the wiring board and connecting the common power supply electrode, and the first power supply terminal and the second power supply terminal, may be included.

With such a configuration, it is possible to supply power to the first switch IC and the second switch IC from an external power supply which is connected to the common power supply electrode connected to the first power supply terminal of the first switch IC and the second power supply terminal of the second switch IC via the power supply line. Since the common power supply electrode provided on the wiring board to supply power to each IC is shared as described above, it is possible to reduce the number of terminals of the switch module.

In addition, a first electrostatic protection section including an inductor provided corresponding to each of the antenna terminals may be included, and each inductor may be connected at one end thereof to the corresponding antenna terminal and is grounded at another end thereof.

With such a configuration, it is possible to protect the switch module from ESD (electro-static discharge) at the antenna element side by the first electrostatic protection section.

In addition, a second electrostatic protection section including a capacitor provided corresponding to each of the antenna terminals may be included, and each capacitor is connected at one end thereof to the corresponding antenna terminal and is connected at another end thereof to the antenna element connected to the antenna terminal.

With such a configuration, it is possible to protect the switch module from ESD at the antenna element side by the second electrostatic protection section.

In addition, the first switch section may include first switches provided corresponding to the antenna terminals, respectively, each of the first switches may be connected at one end thereof to the first common terminal and is connected at another end thereof to the corresponding antenna terminal, the second switch section may include second switches provided corresponding to the signal terminals, respectively, and each of the second switches may be connected at one end thereof to the second common terminal and is connected at another end thereof to the corresponding signal terminal.

With such a configuration, by merely switching any one of the first switches included in the first switch section from an OFF state to an ON state, it is possible to selectively connect the first common terminal and any one of the antenna terminals. Therefore, when any one of the antenna terminals and the first common terminal are selectively connected to each other, it is in a state where only one first switch in an ON state is inserted in a path within the first switch unit which connects the first common terminal and the antenna element connected to the selectively connected antenna terminal, and thus it is possible to reduce transmission loss of a communication signal transmitted between the selectively connected antenna terminal and the first common terminal.

In addition, by merely switching any one of the second switches included in the second switch section from an OFF state to an ON state, it is possible to selectively connect the second common terminal and any one of the signal terminals. Therefore, when the any one of the signal terminals and the second common terminal are selectively connected to each other, it is in a state where only one second switch in an ON state is inserted in a path within the second switch unit which connects the second common terminal and the communication system connected to the selectively connected signal terminal, and thus it is possible reduce transmission loss of a communication signal transmitted between the selectively connected signal terminal and the second common terminal.

In addition, each of the first switches and the second switches may include a field effect transistor.

With such a configuration, since each of the first switches and the second switches includes a field effect transistor, it is possible to further reduce transmission loss of communication signals transmitted within the first switch unit and the second switch unit, and it is possible to reduce the insertion loss of the switch module.

According to various preferred embodiments of the present invention, since one antenna element and one communication system are selectively connected to each other by the first switch section and the second switch section, impedance mismatching between the first common terminal of the first switch unit and the second common terminal of the second switch unit is greatest. However, it is possible to eliminate the impedance mismatching by the matching circuit provided on the signal line which connects the first switch unit (first common terminal) and the second switch unit (second common terminal), and thus it is possible to reduce the insertion loss of the switch module.

Therefore, connection of the matching circuit to the plurality of antenna terminals to which the antenna elements are respectively connected is unnecessary, and it is possible to provide a switch module having a simple configuration. In addition, with the simple configuration in which connection of the matching circuit to each antenna terminal is omitted, it is possible to selectively connect any one of the antenna elements connected to the respective antenna terminals of the first switch unit and any one of the communication systems connected to the respective signal terminals of the second switch unit, by the first switch section and the second switch section.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
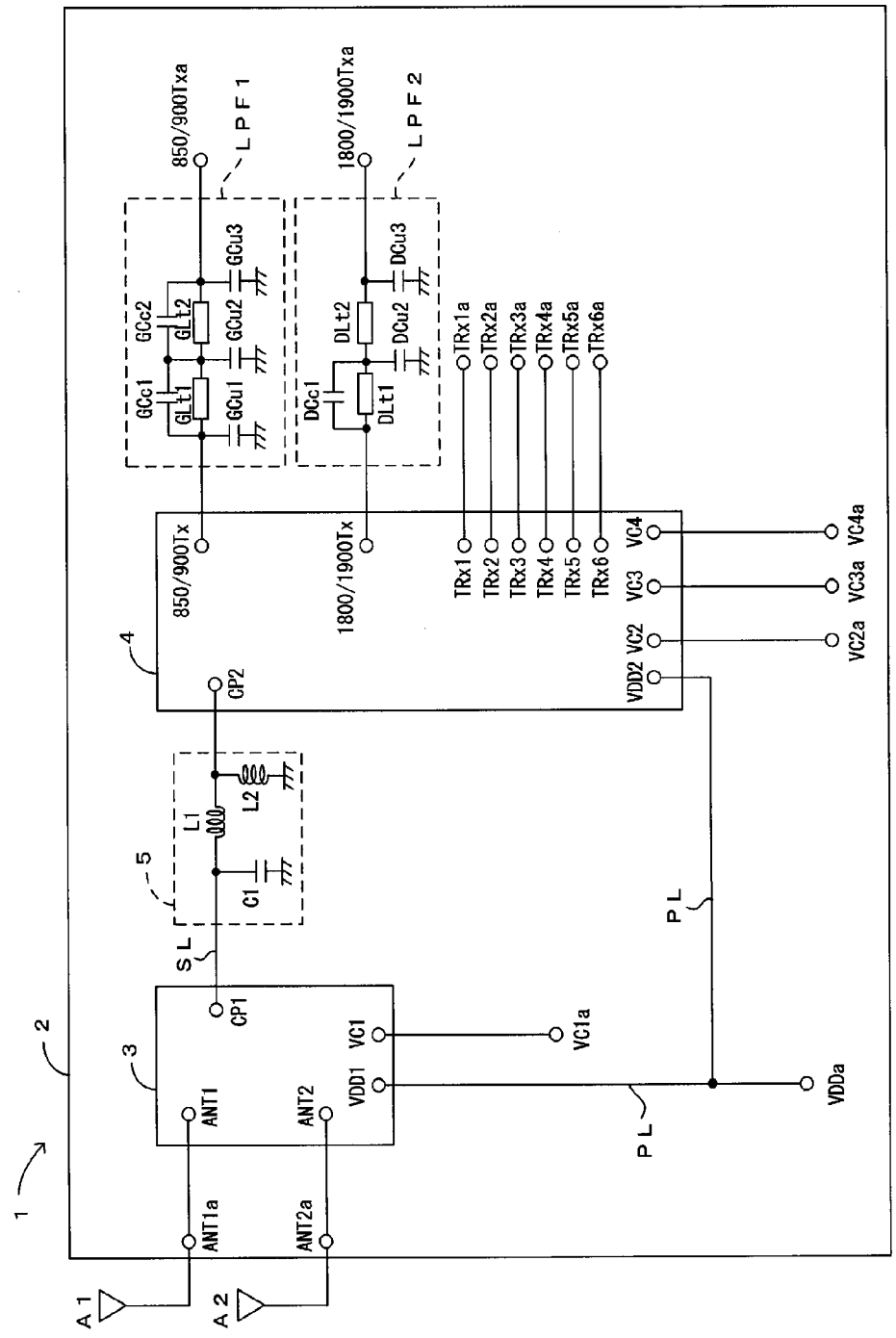
FIG. 1 is a circuit block diagram of a switch module according to a first preferred embodiment of the present invention.
Figure 2:
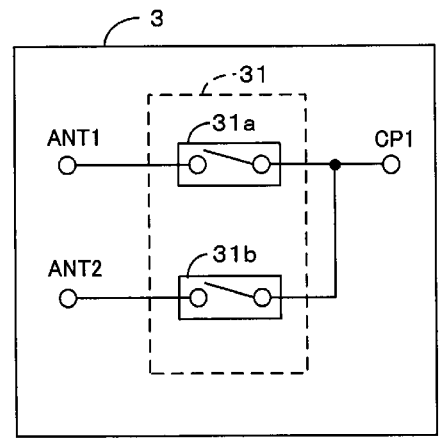
FIG. 2 is a diagram showing the internal configuration of a first switch IC.
Figure 3:
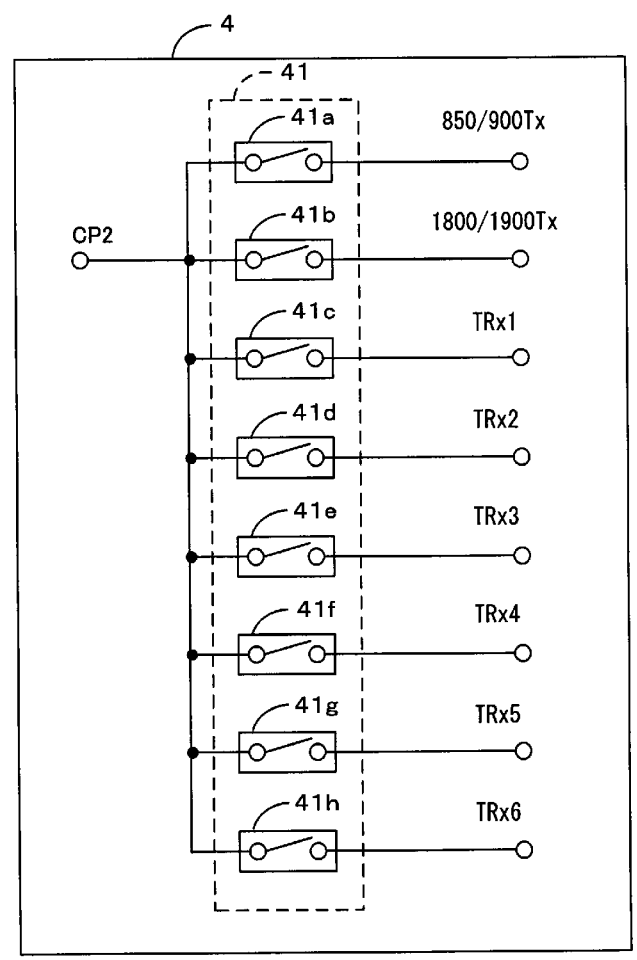
FIG. 3 is a diagram showing the internal configuration of a second switch IC.
Figure 4:
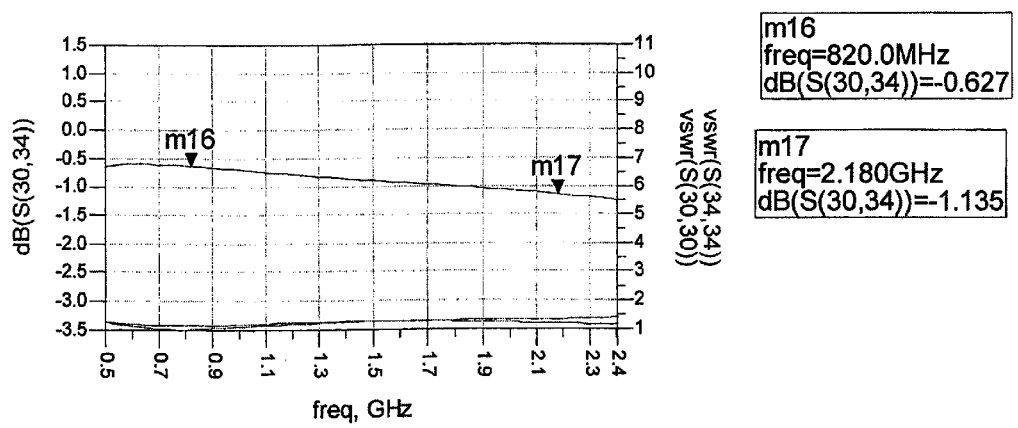
FIG. 4 is a diagram showing transmission characteristics and reflection characteristics of the switch module in FIG. 1.
Figure 5:
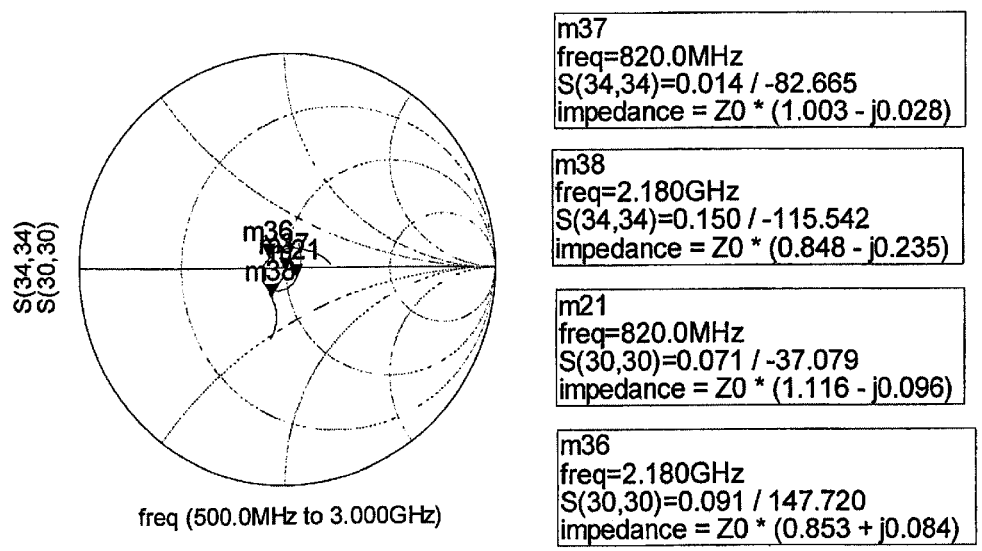
FIG. 5 is a Smith chart showing an impedance curve of the switch module in FIG. 1.

A first preferred embodiment of the present invention will be described with reference to FIGS. 1 to 5. FIG. 1 is a circuit block diagram of a switch module according to the first preferred embodiment of the present invention, FIG. 2 is a diagram showing the internal configuration of a first switch IC, and FIG. 3 is a diagram showing the internal configuration of a second switch IC. In addition, FIG. 4 is a diagram showing transmission characteristics and reflection characteristics of the switch module in FIG. 1, and FIG. 5 is a Smith chart showing an impedance curve of the switch module in FIG. 1. It should be noted that in FIGS. 1 to 3, to facilitate explanation, only components required for describing preferred embodiments of the present invention are shown.

The switch module 1 shown in FIG. 1 includes a plurality of communication systems which perform communication according to communication standards different from each other, such as, for example, the GSM standard, the W-CDMA standard, the LTE standard, and the Bluetooth standard, and a plurality of communication systems which perform communication according to the same communication standard in different bands (frequency bands), and is mounted in a communication apparatus (not shown) which supports multi-modes and multi-bands in which communication is performed according to a plurality of communication standards using a plurality of frequency bands. In addition, the switch module 1 selectively connects a plurality of antennas A1 and A2 (corresponding to "antenna elements" of various preferred embodiments of the present invention) provided in the communication apparatus and a plurality of communication systems mounted in the communication apparatus. In the present preferred embodiment, the antennas A1 and A2 are configured to be able to transmit and receive communication signals in a plurality of frequency bands, and the antennas A1 and A2 which support multi-bands are connected to the switch module 1.

The switch module 1 includes a wiring board 2, a first switch IC 3 (first switch unit), a second switch IC 4 (second switch unit), a signal line SL which connects the first switch IC 3 and the second switch IC 4, and a matching circuit 5 provided on the signal line SL. In addition, the first switch IC 3, the second switch IC 4, the signal line SL, and the matching circuit 5 are provided on the wiring board 2.

The wiring board 2 preferably is a general multilayer board such as an LTCC (low temperature co-fired ceramic) multilayer board or a resin multilayer board formed from a glass epoxy resin or the like, and, for example, the first switch IC 3, the second switch IC 4, and chip components such as inductors and capacitors which define the matching circuit 5, various filter circuits, and the like are mounted on the wiring board 2 according to need. In addition, for example, a plurality of external connection electrodes, a plurality of wiring patterns including the signal line SL and a power supply line PL, circuit elements such as capacitors and inductors which define the matching circuit 5, various filter circuits, and the like are provided on the wiring board 2 by using a conductive material such as Cu and Ag. Moreover, the wiring patterns connect the first switch IC 3, the second switch IC 4, the matching circuit 5, the filter circuits, the respective external connection electrodes, and the like, which are provided on the wiring board 2, to each other, and are defined by wiring electrode patterns and inter-layer connection conductors (via-conductors) provided in each layer of the wiring board 2.

A common power supply electrode VDDa to which an external power supply is connected is provided on the wiring board 2, and a first power supply terminal VDD1 provided in the first switch IC 3 and a second power supply terminal VDD2 provided in the second switch IC 4 are connected to the common power supply electrode VDDa via the power supply line PL provided on the wiring board 2.

As shown in FIGS. 1 and 2, the first switch IC 3 includes a plurality of antenna terminals ANT1 and ANT2 which are connected via wiring patterns to antenna electrodes ANT1a and ANT2a, respectively, provided on the wiring board 2; and a first common terminal CP1. In addition, by the antennas A1 and A2 being connected to the antenna electrodes ANT1a and ANT2a, respectively, the antennas A1 and A2 are connected to the antenna terminals ANT1 and ANT2, respectively.

The first switch IC 3 includes a first switch section 31 which selectively connects either one of the antenna terminals ANT1 and ANT2 and the first common terminal CP1. The first switch section 31 includes switches 31a and 31b which are first switches according to various preferred embodiments of the present invention and provided corresponding to the antenna terminals ANT1 and ANT2, respectively. In addition, each of the switches 31a and 31b is connected at one end thereof to the first common terminal CP1 and is connected at the other end thereof to corresponding one of the antenna terminals ANT1 and ANT2. Moreover, in the present preferred embodiment, each of the switches 31a and 31b is preferably defined by an inductor, a capacitor, and a resistor being connected to a field effect transistor (FET) according to need.

The first switch IC 3 also includes a control terminal VC1 to which a one-bit control signal to selectively ON/OFF control of each of the switches 31a and 31b provided in the first switch section 31 is inputted. In addition, the control terminal VC1 is connected via a wiring pattern to a control electrode VC1a provided on the wiring board 2, and by a control signal being inputted from the outside to the control electrode VC1a, the control signal is inputted to the control terminal VC1.

ON/OFF of each of the switches 31a and 31b is selectively controlled, for example, as follows. Specifically, the control terminal VC1 and the FET that defines the switch 31a are connected to each other, and the control terminal VC1 and the FET that defines the switch 31b are connected to each other with an inverter circuit interposed therebetween. When a high-level signal is inputted to the control terminal VC1, the switch 31a is turned on and the switch 31b is turned on, so that the antenna terminal ANT1 and the first common terminal CP1 are connected to each other. On the other hand, when a low-level signal is inputted to the control terminal VC1, the switch 31a is turned off and the switch 31b is turned off, so that the antenna terminal ANT2 and the first common terminal CP1 are connected to each other.

As shown in FIGS. 1 and 3, the second switch IC 4 includes a second common terminal CP2, a plurality of signal terminals 850/900Tx and 1800/1900Tx which are connected via wiring patterns to signal electrodes 850/900Txa and 1800/1900Txa, respectively, provided on the wiring board 2, and a plurality of signal terminals TRx1 to TRx6 which are connected via wiring patterns to signal electrodes TRx1a to TRx6a, respectively, provided on the wiring board 2. In addition, the second common terminal CP2 is connected to the first common terminal CP1 of the first switch IC 3 via the signal line SL. Moreover, by communication systems (not shown) corresponding to the signal electrodes 850/900Txa, 1800/1900Txa, and TRx1a to TRx6a, respectively, being connected, communication systems corresponding to the signal terminals 850/900Tx, 1800/1900Tx, and TRx1 to TRx6 are connected.

In the present preferred embodiment, a transmitting circuit section of a communication system that performs communication according to the GSM 850 standard using a 850 MHz band (824 MHz to 849 MHz) and a transmitting circuit section of a communication system that performs communication according to the GSM 900 standard using a 900 MHz band (880 MHz to 915 MHz) are connected to the signal electrode 850/900Txa. In addition, a transmitting circuit section of a communication system that performs communication according to the GSM 1800 standard using a 1800 MHz band (1710 MHz to 1785 MHz) and a transmitting circuit section of a communication system that performs communication according to the GSM 1900 standard using a 1900 MHz band (1850 MHz to 1910 MHz) are connected to the signal electrode 1800/1900Txa. Moreover, for example, a communication system that performs communication according to the W-CDMA standard or the LTE standard using any one of a band 1 (up frequency: 1920 MHz to 1980 MHz, down frequency: 2110 MHz to 2170 MHz), a band 2 (up frequency: 1850 MHz to 1910 MHz, down frequency: 1930 MHz to 1990 MHz), a band 3 (up frequency: 880 MHz to 915 MHz, down frequency: 925 MHz to 960 MHz), a band 5 (up frequency: 824 MHz to 849 MHz, down frequency: 869 MHz to 894 MHz), and a band 13 (up frequency: 777 MHz to 787 MHz, down frequency: 746 MHz to 756 MHz), a communication system that performs communication according to the Bluetooth standard using a 2.4 GHz band, and the like are connected to the signal electrodes TRx1a to TRx6a, respectively. It should be noted that frequency bands (bands) used for communications according to the GSM standard, the W-CDMA standard, and the LTE standard are not limited to the above-described bands.

In the present preferred embodiment, the signal electrodes 850/900Txa and 1800/1900Txa are connected to the signal terminals 850/900Tx and 1800/1900Tx with low pass filters LPF1 and LPF2 interposed therebetween, respectively.

The low pass filter LPF1 attenuates second harmonic components and third harmonic components of communication signals outputted from the transmitting circuit section of the communication system that performs communication according to the GSM 850 standard and the transmitting circuit section of the communication system that performs communication according to the GSM 900 standard. The low pass filter LPF1 includes a filter circuit which includes inductors GLt1 and GLt2 which are connected in series between the signal terminal 850/900Tx and the signal electrode 850/900Txa, a capacitor GCc1 which is connected in parallel with the inductor GLt1, a capacitor GCc2 which is connected in parallel with the inductor GLt2, a capacitor GCu1 which is connected at one end thereof to an output end of the low pass filter LPF1 and is grounded at another end thereof, a capacitor GCu2 which is connected at one end thereof to a connection point between the inductors GLt1 and GLt2 and is grounded at another end thereof, and a capacitor GCu3 which is connected at one end thereof to an input end of the low pass filter LPF1 and is grounded at another end thereof.

The low pass filter LPF2 attenuates second harmonic components of communication signals outputted from the transmitting circuit section of the communication system that performs the communication according to the GSM 1800 standard and the transmitting circuit section of the communication system that performs communication according to the GSM 1900 standard. The low pass filter LPF2 includes a filter circuit which includes inductors DLt1 and DLt2 which are connected in series between the signal terminal 1800/1900Tx and the signal electrode 1800/1900Txa, a capacitor DCc1 which is connected in parallel with the inductor DLt1, a capacitor DCu2 which is connected at one end thereof to a connection point between the inductors DLt1 and DLt2 and is grounded at another end thereof, and a capacitor DCu3 which is connected at one end thereof to an input end of the low pass filter LPF2 and is grounded at another end thereof.

In the present preferred embodiment, each inductor and each capacitor which define the low pass filters LPF1 and LPF2 are preferably configured by combining a stripline and a plate electrode provided on the wiring board 2 by using a conductive material, but some or all of the inductors and the capacitors which define the low pass filters LPF1 and LPF2 may be configured in a chip component and mounted on the wiring board 2.

The second switch IC 4 includes a second switch section 41 which selectively connects the second common terminal CP2 and any one of the signal terminals 850/900Tx, 1800/1900Tx, and TRx1 to TRx6. The second switch section 41 preferably includes eight switches 41a to 42h which are second switches according to various preferred embodiments of the present invention and provided corresponding to the signal terminals 850/900Tx, 1800/1900Tx, and TRx1 to TRx6, respectively. In addition, each of the switches 41a to 41h is connected at one end thereof to the second common terminal CP2 and is connected at another end thereof to corresponding one of the signal terminals 850/900Tx, 1800/1900Tx, and TRx1 to TRx6. Moreover, in the present preferred embodiment, each of the switches 41a to 41h is preferably defined by an inductor, a capacitor, and a resistor being connected to a field effect transistor (FET) according to need.

The second switch IC 4 also includes control terminals VC2 to VC4 to which three-bit control signals to selectively ON/OFF control each of the switches 41a to 41h provided in the second switch section 41 are inputted. In addition, the control terminals VC2 to VC4 are connected via wiring patterns to control electrodes VC2a to VC4a, respectively, provided on the wiring board 2, and by control signals being inputted from the outside to the control electrodes VC2a to VC4a, the control signals are inputted to the control terminals VC2 to VC4.

ON/OFF of each of the switches 41a to 41h is selectively controlled, for example, as follows. Specifically, the control terminals VC2 to VC4 and the FETs that define the switches 41a to 41h are connected to each other via a decoder. When a three-bit control signal is inputted to each of the control terminals VC2 to V4, the inputted control signal is decoded by the decoder, and a high-level signal is outputted to any one of the switches 41a to 41h to turn on that switch, so that the second common terminal CP2 and the signal terminal connected to that switch are connected to each other.

The matching circuit 5 is provided on the signal line SL which connects the first common terminal CP1 of the first switch IC 3 which switches between the antennas A1 and A2 and the second common terminal CP2 of the second switch IC 4 which switches between each communication system. The matching circuit 5 includes an inductor L1 which is connected in series with the signal line SL, an inductor L2 which is connected at one end thereof to an end portion of the inductor L1 at the second common terminal CP2 (second switch IC 4) side and is grounded at another end thereof, and a capacitor C1 which is connected at one end thereof to an end portion of the inductor L1 at the first common terminal CP1 (first switch IC 3) side and is grounded at another end thereof. In the matching circuit 5 configured as described above, a high-frequency side impedance is matched mainly by the inductor L1 and the capacitor C1, and a low-frequency side impedance is matched mainly by the inductor L2.

In the present preferred embodiment, the inductors L1 and L2 which define the matching circuit 5 are configured in a chip component and mounted on the wiring board 2, and the capacitor C1 which defines the matching circuit 5 includes a plate electrode and the like provided on the wiring board 2 by using a conductive material, but the matching circuit 5 may be configured of inductors defined by a stripline or the like provided on the wiring board 2 by using a conductive material, instead of the inductors L1 and L2 provided in the chip component, or the matching circuit 5 may be configured by using a capacitor configured in a chip component instead of the capacitor C1.

In the switch module 1 configured as described above, the first switch IC 3 configured to switch between the antennas A1 and A2, and the second switch IC 4 configured to switch between each communication system (the GSM standard, the W-CDMA standard, the LTE standard, the Bluetooth standard, etc.) are individually provided, and the first switch IC 3 and the second switch IC 4 are connected to each other via the single signal line SL. That is, in the first switch IC 3 which includes the antenna terminals ANT1 and ANT2 to which the antennas A1 and A2 are respectively connected, and the first common terminal CP1, and either one of the antennas A1 and A2 and the first common terminal CP1 are selectively connected to each other by the first switch section 31.

In the second switch IC 4 which includes the second common terminal CP2 and the signal terminals 850/900Tx, 1800/1900Tx, and TRx1 to TRx6 to which the corresponding communication systems are respectively connected, the second common terminal CP2 and any one of the signal terminals 850/900Tx, 1800/1900Tx, and TRx1 to TRx6 are selectively connected to each other by the second switch section 41. The antenna connected to either one of the antenna terminals ANT1 and ANT2 which are selectively connected to the first common terminal CP1 by the first switch section 31 in the first switch IC 3, and the communication system connected to any one of the signal terminals 850/900Tx, 1800/1900Tx, and TRx1 to TRx6 which are selectively connected to the second common terminal CP2 by the second switch section 41 in the second switch IC 4 are connected to each other via the single signal line SL which connects the first common terminal CP1 of the first switch IC 3 and the second common terminal CP2 of the second switch IC 4.

In the communication apparatus in which the switch module 1 is mounted, communication by diversity is executed by using the antennas A1 and A2, for example, as follows. Specifically, first, before the communication is started, the antenna A1 connected to the antenna terminal ANT1 of the first switch IC 3 and the respective communication systems connected to the signal terminals 850/900Tx, 1800/1900Tx, and TRx1 to TRx6 of the second switch IC 4 are sequentially and selectively connected, and frequency scan is performed to search for a frequency channel on which reception is possible, such that all frequency channels on which reception is possible are detected. Next, a frequency channel for the communication system to be activated is selected on the basis of a result of the frequency scan using the antenna A1.

Subsequently, the antenna A2 connected to the antenna terminal ANT2 of the first switch IC 3, and the communication system selected to be activated from among the communication systems connected to the signal terminals 850/900Tx, 1800/1900Tx, and TRx1 to TRx6 of the second switch IC 4, are connected to each other, and a communication signal of the communication system is received. In addition, the signal levels (amplitudes) of reception signals of the selected communication systems which are received by the antennas A1 and A2 are compared, such that an antenna to be connected to the transmitting and receiving circuits of the selected communication system is selected from the antennas A1 and A2. Then, the selected antenna and the selected communication system are connected to each other by the switch module 1, and communication using the antenna and the communication system is executed in the communication apparatus.

Next, the frequency characteristics of the switch module 1 will be described with reference to FIGS. 4 and 5. FIG. 4 is a diagram showing transmission characteristics and reflection characteristics of the switch module in FIG. 1, and FIG. 5 is a Smith chart showing an impedance curve of the switch module in FIG. 1. In FIGS. 4 and 5, a port (30) indicates the antenna terminal ANT1 of the first switch IC 3 in FIG. 1, and a port (34) indicates the signal terminal TRx1 of the second switch IC 4 in FIG. 1.

In FIG. 4, the horizontal axis indicates frequency (GHz), the left vertical axis indicates transmission characteristics (dB), and the right vertical axis indicates transmission characteristics (VSWR: Voltage Standing Wave Ratio). In addition, in FIG. 4, the upper curve indicates transmission characteristics from the signal terminal TRx1 to the antenna terminal ANT1. Moreover, in FIG. 4, the lower two curves indicate reflection characteristics observed from the antenna terminal ANT1 and reflection characteristics observed from the signal terminal TRx1. As shown in FIG. 4, the switch module 1 has very good transmission characteristics and reflection characteristics in a wide band from 500 MHz to 2.4 GHz.

The Smith chart in FIG. 5 indicates an impedance observed from the antenna terminal ANT1 and an impedance observed from the signal terminal TRx1 in 500 MHz to 3.0 GHz. As shown in FIG. 5, in the switch module 1, the impedance observed from the antenna terminal ANT1 and the impedance observed from the signal terminal TRx1 are matched to substantially 50Ω in a wide band from 500 MHz to 3.0 GHz, for example.

Figure 6:
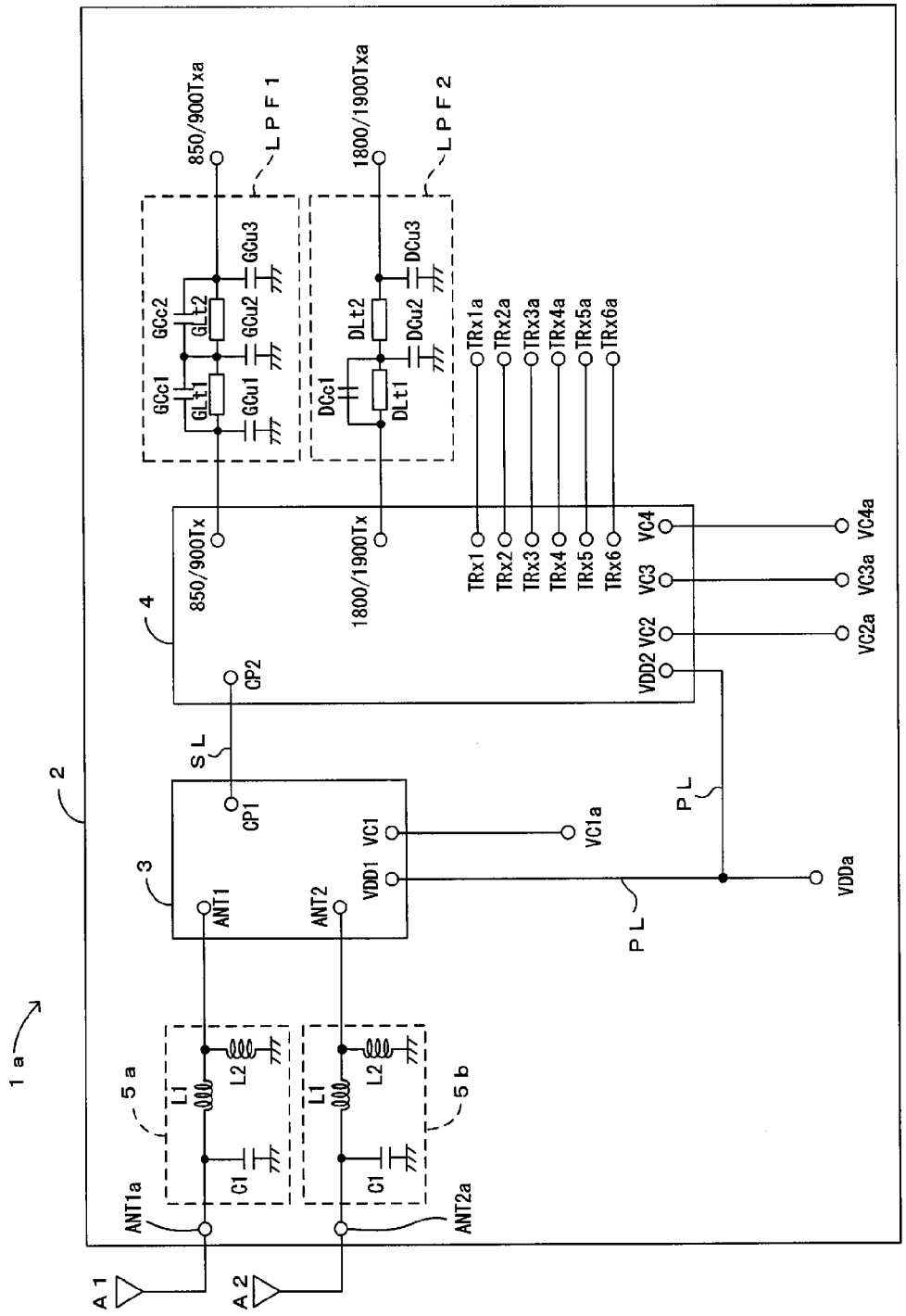
FIG. 6 is a circuit block diagram showing a comparative example for the switch module in FIG. 1.
Figure 7:
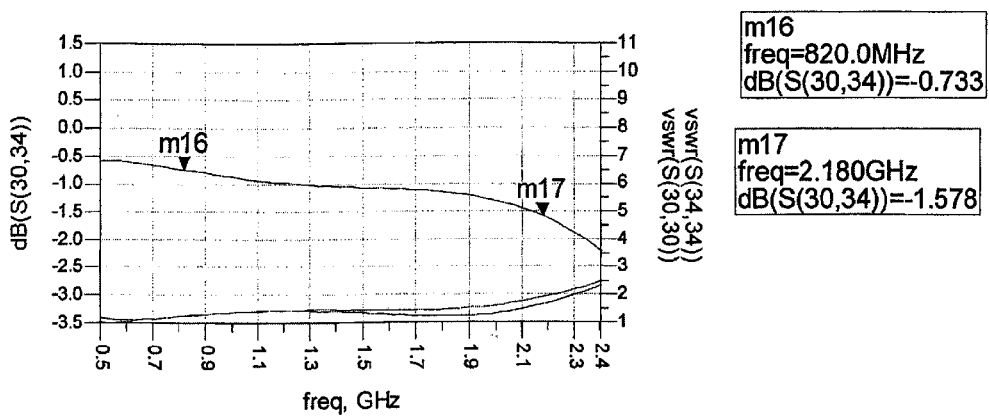
FIG. 7 is a diagram showing transmission characteristics and reflection characteristics of the comparative example in FIG. 6.
Figure 8:
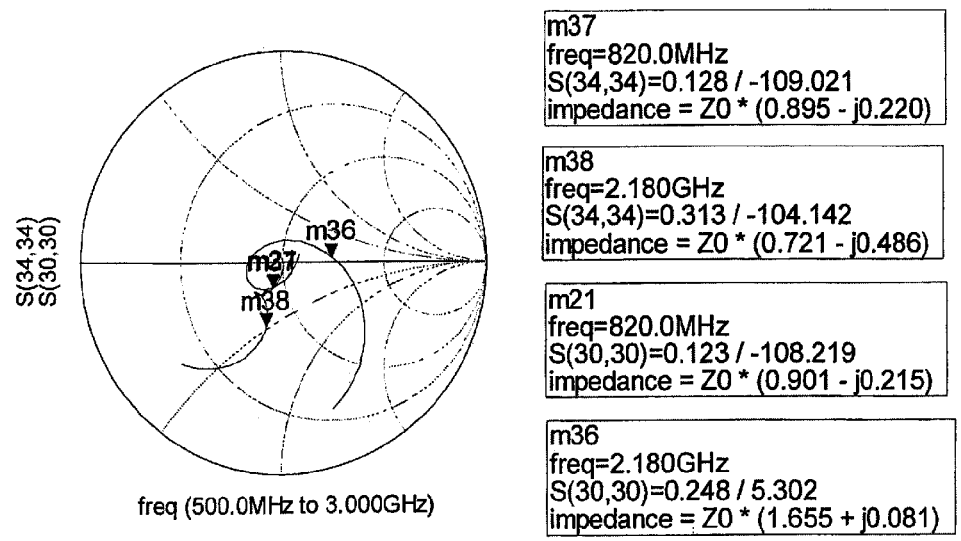
FIG. 8 is a Smith chart showing an impedance curve of the comparative example in FIG. 6.

Next, a comparative example for the above-described switch module 1 will be described with reference to FIGS. 6 to 8. FIG. 6 is a circuit block diagram showing a switch module which is the comparative example for the switch module in FIG. 1, FIG. 7 is a diagram showing transmission characteristics and reflection characteristics of the switch module in FIG. 6, and FIG. 8 is a Smith chart showing an impedance curve of the switch module in FIG. 6. In FIGS. 7 and 8, a port (30) indicates the antenna electrode ANT1a connected to the antenna terminal ANT1 of the first switch IC 3 in FIG. 6, and a port (34) indicates the signal terminal TRx1 of the second switch IC 4 in FIG. 6.

The switch module 1a shown in FIG. 6 is different from the switch module 1 in FIG. 1 in that no matching circuit is provided between the switch IC3 and the switch IC4 and matching circuits 5a and 5b each having the same configuration as that of the matching circuit 5 in FIG. 1 are provided between the antenna electrode ANT1a and the antenna terminal ANT1 and between the antenna electrode ANT2a and the antenna terminal ANT2, respectively. The other components are the same as those of the switch module 1, thus such components are designated by the same reference signs, and the description thereof is omitted.

Next, frequency characteristics of the switch module 1a in FIG. 6, which is the comparative example for the switch module 1 in FIG. 1, will be described.

In FIG. 7, the horizontal axis indicates frequency (GHz), the left vertical axis indicates transmission characteristics (dB), and the right vertical axis indicates transmission characteristics (VSWR: Voltage Standing Wave Ratio). In addition, in FIG. 7, the upper curve indicates transmission characteristics from the signal terminal TRx1 to the antenna electrode ANT1a. Moreover, in FIG. 7, the lower two curves indicate reflection characteristics observed from the antenna electrode ANT2a and reflection characteristics observed from the signal terminal TRx1. As shown in FIG. 7, the switch module 1a has inferior transmission characteristics and reflection characteristics particularly in the high-frequency side band, as compared to the switch module 1 in FIG. 1.

In addition, the Smith chart in FIG. 8 indicates an impedance observed from the antenna electrode ANT1a and an impedance observed from the signal terminal TRx1 in 500 MHz to 3.0 GHz. As shown in FIG. 8, in the switch module 1a, particularly in the high-frequency side band, the impedance observed from the antenna electrode ANT1a and the impedance observed from the signal terminal TRx1 deviate from 50Ω to come to a non-matching state.

As described above, in the present preferred embodiment, although impedance mismatching between the first common terminal CP1 of the first switch IC 3 and the second common terminal CP2 of the second switch IC 4 is greatest, since it is possible to eliminate the impedance mismatching by the matching circuit 5 provided on the signal line SL which connects the first common terminal CP1 and the second common terminal CP2, it is possible to reduce the insertion loss of the switch module 1. Therefore, connection of the matching circuit to the antenna terminals ANT1 and ANT2 to which the antennas A1 and A2 are respectively connected is unnecessary, and it is possible to provide a switch module 1 having a simple configuration.

Even with the simple configuration in which connection of the matching circuit to the antenna terminals ANT1 and ANT2 is omitted, it is possible to selectively connect, by the first switch section 31 of the first switch IC 3 and the second switch section 41 of the second switch IC 4, either one of the antennas A1 and A2, which are connected to the antenna terminals ANT1 and ANT2 of the first switch IC 3, respectively, and any one of the communication systems, which are connected to the signal terminals 850/900Tx, 1800/1900Tx, and TRx1 to TRx6 of the second switch IC 4, respectively.

Since the inductor L2 which is located at the antenna terminal ANT1 side of the first switch IC 3 and defines the matching circuit 5 is grounded, it is possible to simultaneously discharge the first switch IC 3 and the second switch IC 4 via the antenna terminal ANT1 and the antenna terminal ANT2 to the ground. Therefore, it is possible to improve the switching characteristics of the first switch IC 3 and the second switch IC 4.

It is unnecessary to connect the matching circuit to the antenna terminals ANT1 and ANT2 As in the related art, and thus it is possible to reduce the cost and the size of the switch module 1.

It is possible to provide the switch module 1 having a practical configuration in which the first switch IC 3 and the second switch IC 4 which are connected to each other via the single signal line SL are provided on the wiring board 2. In addition, the switch module 1 is practical since it is possible to form the matching circuit 5, which is provided on the signal line SL which connects the first switch IC 3 and the second switch IC 4, by a chip component of an inductor, a capacitor, and the like provided on the wiring board 2, or an inductor, a capacitor, and the like defined by a stripline, a plate electrode, and the like provided on the wiring board 2.

It is possible to supply power to the first switch IC 3 and the second switch IC 4 from an external power supply which is connected to the common power supply electrode VDDa which is connected to the power supply terminal VDD1 of the first switch IC 3 and the power supply terminal VDD2 of the second switch IC 4 via the power supply line PL.

Since the common power supply electrode VDDa which is provided on the wiring board 2 in order to supply power to the switch ICs 3 and 4 is shared as described above, it is possible to reduce the number of terminals of the switch module 1.

The first switch section 31 of the first switch IC 3 includes the switches 31a and 31b provided corresponding to the antenna terminals ANT1 and ANT2, respectively, and the second switch section 41 of the second switch IC 4 includes the switches 41a to 41h provided corresponding to the signal terminals 850/900Tx, 1800/1900Tx, and TRx1 to TRx6, respectively.

With such a configuration, by merely switching any one of the switches 31a and 31b included in the first switch section 31 of the first switch IC 3 from an OFF state to an ON state, it is possible to selectively connect the first common terminal CP1 and any one of the antenna terminals ANT1 and ANT2. Therefore, when any one of the antenna terminals ANT1 and ANT2 and the first common terminal CP1 are selectively connected to each other, it is in a state where only one switch in an ON state is inserted in a path within the first switch IC 3 that connects the first common terminal CP1 and the antenna connected to the selectively connected antenna terminal, and thus it is possible to reduce transmission loss of a communication signal transmitted between the selectively connected antenna terminal and the first common terminal CP1.

Similarly, by merely switching any one of the switches 41a to 41h included in the second switch section 41 of the second switch IC 4 from an OFF state to an ON state, it is possible to selectively connect the second common terminal CP2 and any one of the signal terminals 850/900Tx, 1800/1900Tx, and TRx1 to TRx6. Therefore, when any one of the signal terminals 850/900Tx, 1800/1900Tx, and TRx1 to TRx6 and the second common terminal CP2 are selectively connected to each other, it is in a state where only one switch in an ON state is inserted in a path within the second switch IC 4 which connects the second common terminal CP2 and the communication system connected to the selectively connected signal terminal, and thus it is possible to reduce transmission loss of a communication signal transmitted between the selectively connected signal terminal and the second common terminal CP2.

Since each of the switches 31a and 31b and the switches 41a to 41h preferably is defined by a field effect transistor, it is possible to further reduce transmission loss of a communication signal transmitted within the first switch IC 3 and the second switch IC 4, and it is possible to reduce the insertion loss of the switch module 1.

Second Preferred Embodiment

Figure 9:
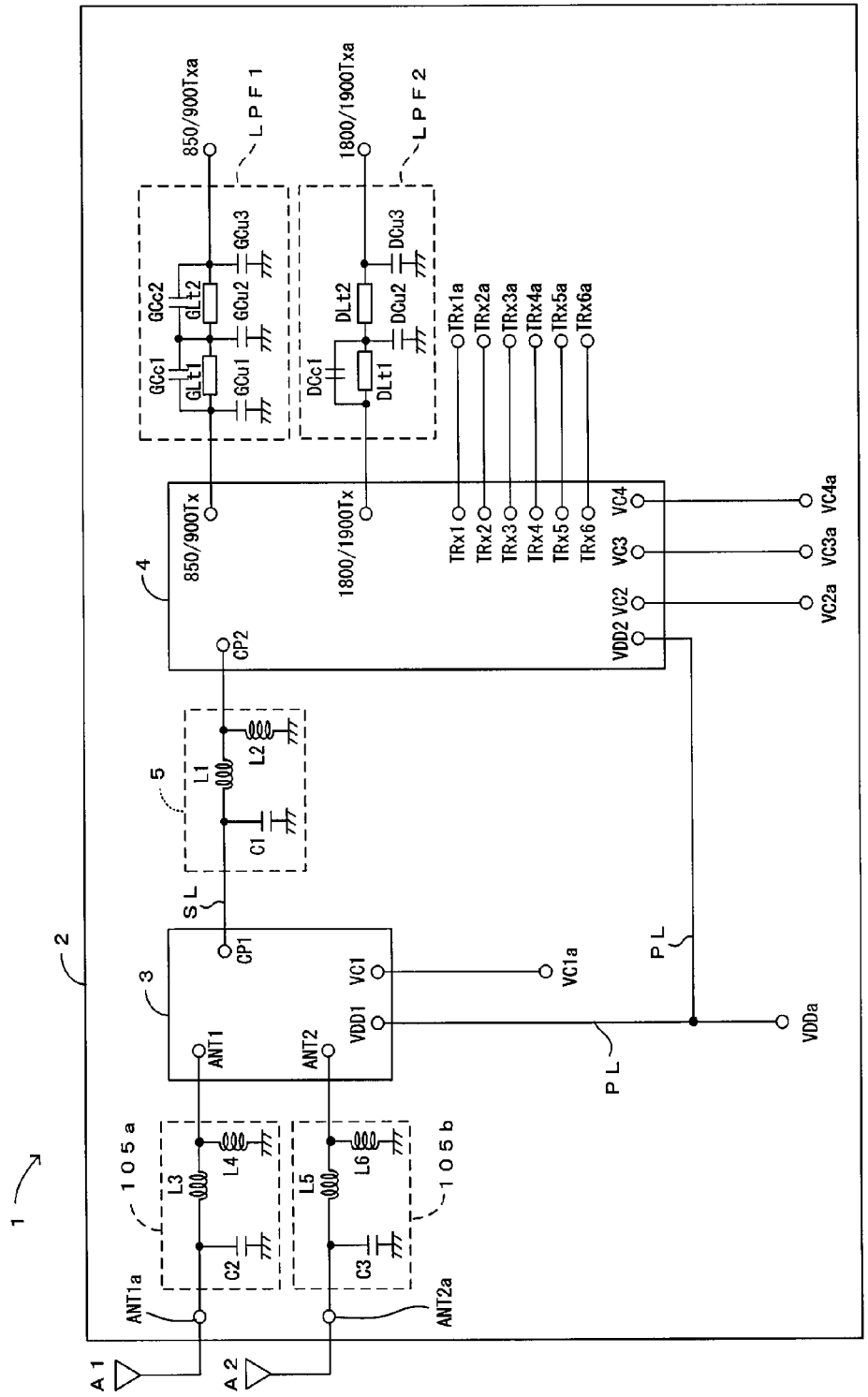
FIG. 9 is a circuit block diagram of a switch module according to a second preferred embodiment of the present invention.

A second preferred embodiment of the present invention will be described with reference to FIG. 9. FIG. 9 is a circuit block diagram of a switch module according to the second preferred embodiment of the present invention. The switch module 1 of the second preferred embodiment is different from the above-described first preferred embodiment in that, as shown in FIG. 9, matching circuits 105a and 105b having substantially the same configuration as that of the matching circuit 5 are connected to the antenna terminals ANT1 and ANT2, respectively. The other components are the same as those in the first preferred embodiment, thus such components are designated by the same reference signs, and the description thereof is omitted.

The matching circuit 105a is provided on the wiring pattern that connects the antenna terminal ANT1 of the first switch IC 3 and the antenna electrode ANT1a. The matching circuit 105a includes an inductor L3 which is connected in series with the wiring pattern, an inductor L4 which is connected at one end thereof to an end portion of the inductor L3 at the antenna terminal ANT1 (first switch IC 3) side and is grounded at another end thereof, and a capacitor C2 which is connected at one end thereof to an end portion of the inductor L3 at the antenna electrode ANT1a (antenna A1) side and is grounded at another end thereof. In addition, the matching circuit 105b is provided on the wiring pattern that connects the antenna terminal ANT2 of the first switch IC 3 and the antenna electrode ANT2a. The matching circuit 105b includes an inductor L5 which is connected in series with the wiring pattern, an inductor L6 which is connected at one end thereof to an end portion of the inductor L5 at the antenna terminal ANT2 (first switch IC 3) side and is grounded at another end thereof, and a capacitor C3 which is connected at one end thereof to an end portion of the inductor L5 at the antenna electrode ANT2a (antenna A2) side and is grounded at another end thereof.

In the matching circuits 105a and 105b configured as described above, a high-frequency side impedance is matched mainly by the inductors L3 and L5 and the capacitors C2 and C3, and a low-frequency side impedance is matched mainly by the inductors L4 and L6.

As described above, in the second preferred embodiment, it is possible to achieve the same advantageous effects as those in the above-described first preferred embodiment, and it is possible to achieve further accurate impedance matching between the antennas A1 and A2 and each communication system by the matching circuits 105a and 105b.

The inductors L4 and L6 are connected at one ends thereof to the corresponding antenna terminals ANT1 and ANT2 and are grounded at other ends thereof. Therefore, it is possible to protect the switch module 1 from ESD at the antennas A1 and A2 side by the inductors L4 and L6. As described above, the inductors L4 and L6 serve as a "first electrostatic protection section" of various preferred embodiments of the present invention.

Third Preferred Embodiment

Figure 10:
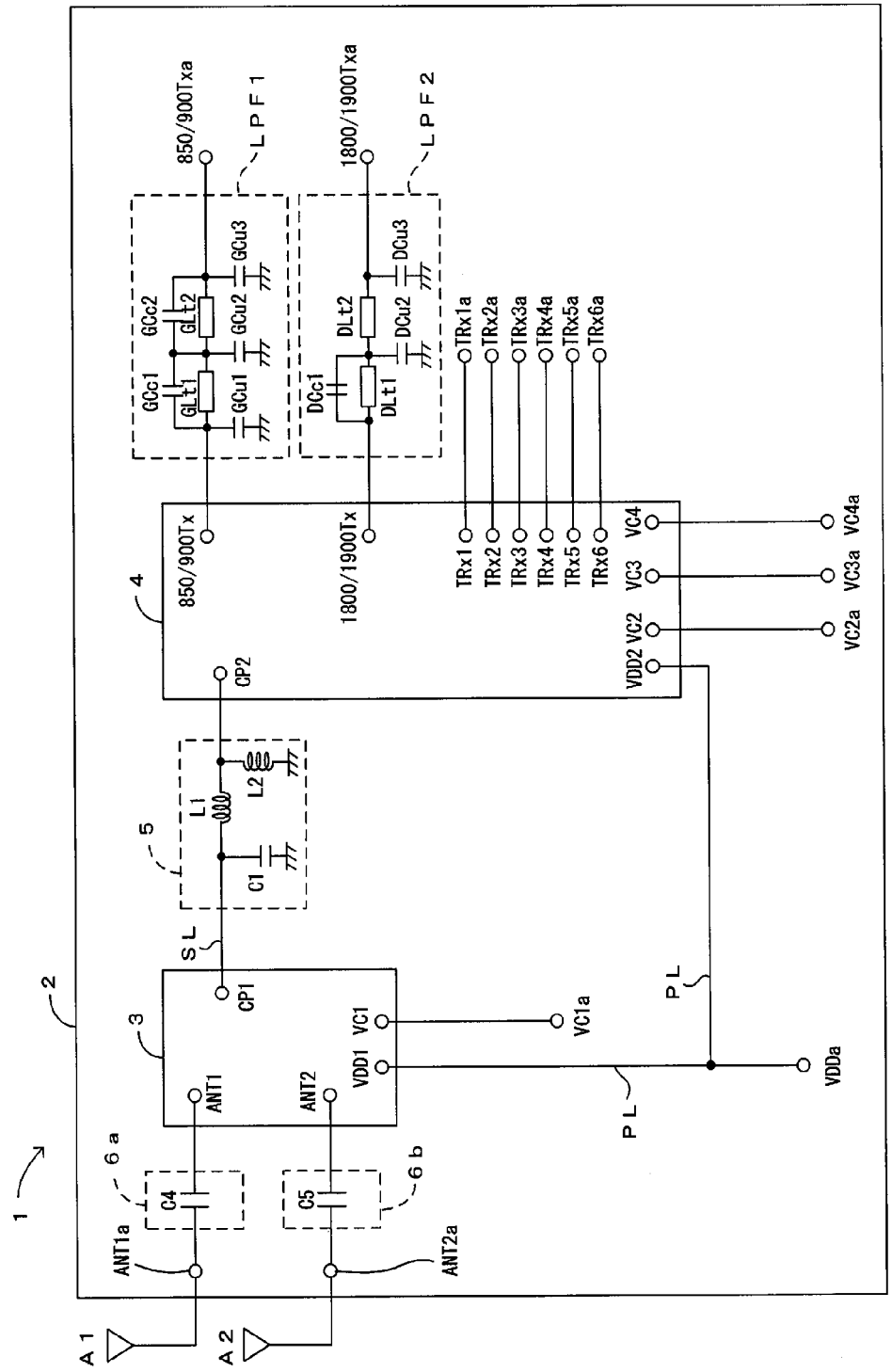
FIG. 10 is a circuit block diagram of a switch module according to a third preferred embodiment of the present invention.

A third preferred embodiment of the present invention will be described with reference to FIG. 10. FIG. 10 is a circuit block diagram of a switch module according to the third preferred embodiment of the present invention. The switch module 1 of the third preferred embodiment is different from the above-described first preferred embodiment in, as shown in FIG. 10, including two second electrostatic protection sections 6a and 6b (corresponding to a "second electrostatic protection section" of various preferred embodiments of the present invention) including capacitors C4 and C5 provided corresponding to the antenna terminals ANT1 and ANT2, respectively. In addition, the capacitor C4 included in the electrostatic protection section 6a is connected at one end thereof to the corresponding antenna terminal ANT1 and is connected at another end thereof to the antenna A1 connected to the antenna terminal ANT1. Moreover, the capacitor C5 included in the electrostatic protection section 6b is connected at one end thereof to the corresponding antenna terminal ANT2 and is connected at another end thereof to the antenna A2 connected to the antenna terminal ANT2. The other components are the same as those in the first preferred embodiment, thus such components are designated by the same reference signs, and the description thereof is omitted.

As described above, in the third preferred embodiment, it is possible to achieve the same advantageous effects as those in the above-described first preferred embodiment, and it is possible to protect the switch module 1 from ESD at the antenna element side by both electrostatic protection sections 6a and 6b.

Fourth Preferred Embodiment

Figure 11:
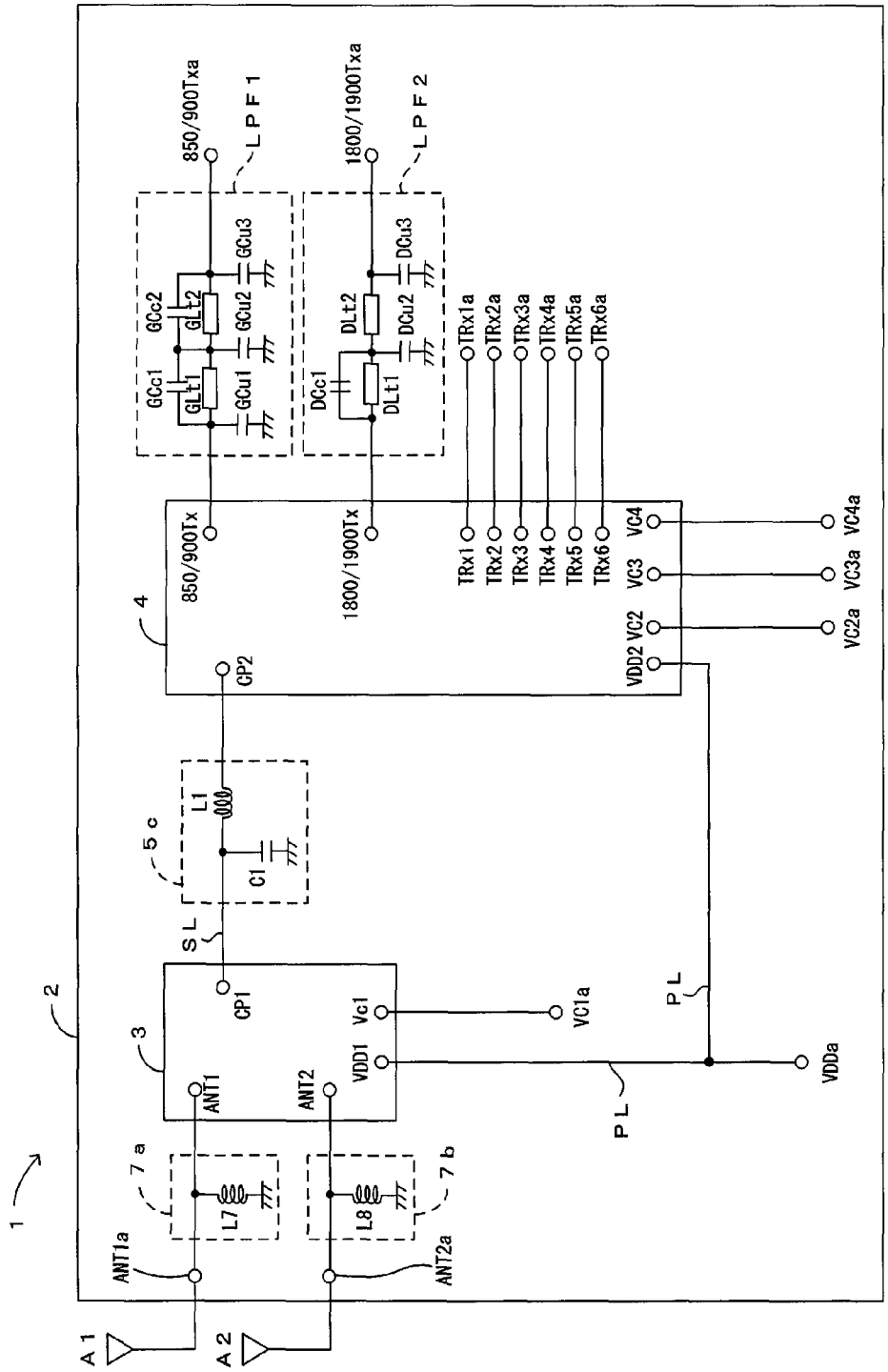
FIG. 11 is a circuit block diagram of a switch module according to a fourth preferred embodiment of the present invention.

A fourth preferred embodiment of the present invention will be described with reference to FIG. 11. FIG. 11 is a circuit block diagram of a switch module according to the fourth preferred embodiment of the present invention. The switch module 1 of the fourth preferred embodiment is different from the above-described first preferred embodiment in, as shown in FIG. 11, including two electrostatic protection sections 7a and 7b (corresponding to the "first electrostatic protection section" according to various preferred embodiments of the present invention) including inductors L7 and L8 provided corresponding to the antenna terminals ANT1 and ANT2, respectively. In addition, the inductor L7 included in the electrostatic protection section 7a is connected at one end thereof to the corresponding antenna terminal ANT1 and is grounded at another end thereof, and the inductor L8 included in the electrostatic protection section 7b is connected at one end thereof to the corresponding antenna terminal ANT2 and is grounded at another end thereof.

In addition, a low-frequency side impedance is matched mainly by the inductors L7 and L8 included in both electrostatic protection sections 7a and 7b. Therefore, in the fourth preferred embodiment, a matching circuit 5c provided between the first common terminal CP1 of the first switch IC 3 and the second common terminal CP2 of the second switch IC 4 is formed of the inductor L1 and the capacitor C1 by which a high-frequency side impedance is mainly matched. The other components are the same as those in the first preferred embodiment, thus such components are designated by the same reference signs, and the description thereof is omitted.

As described above, in the fourth preferred embodiment, it is possible to achieve the same advantageous effects as those in the above-described first preferred embodiment, and it is possible to protect the switch module 1 from ESD at the antenna element side by both electrostatic protection sections 7a and 7b.

In addition, in the fourth preferred embodiment, it is possible to simplify the matching circuit 5c by providing both electrostatic protection sections 7a and 7b.

Fifth Preferred Embodiment

Figure 12:
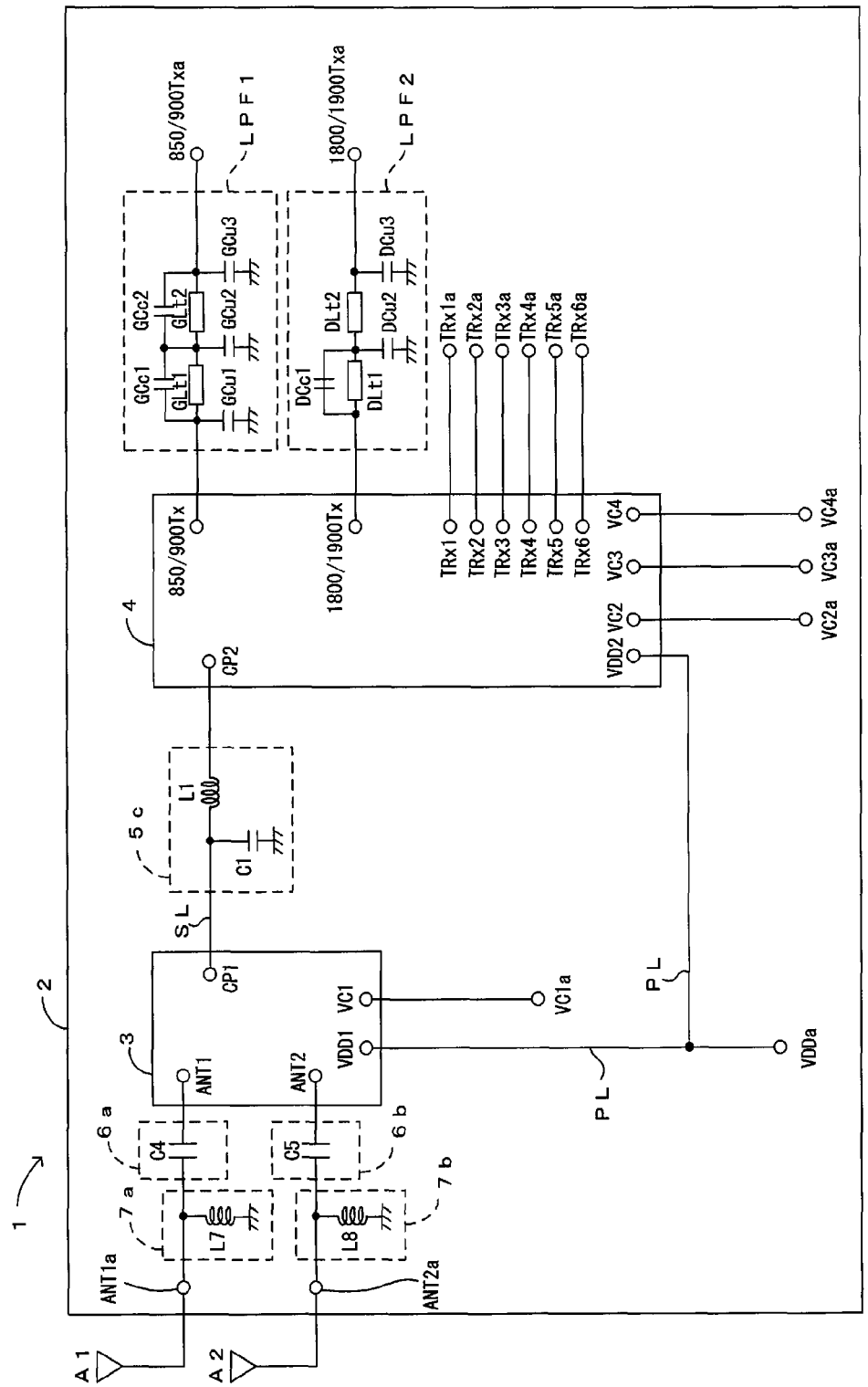
FIG. 12 is a circuit block diagram of a switch module according to a fifth preferred embodiment of the present invention.
Figure 13:
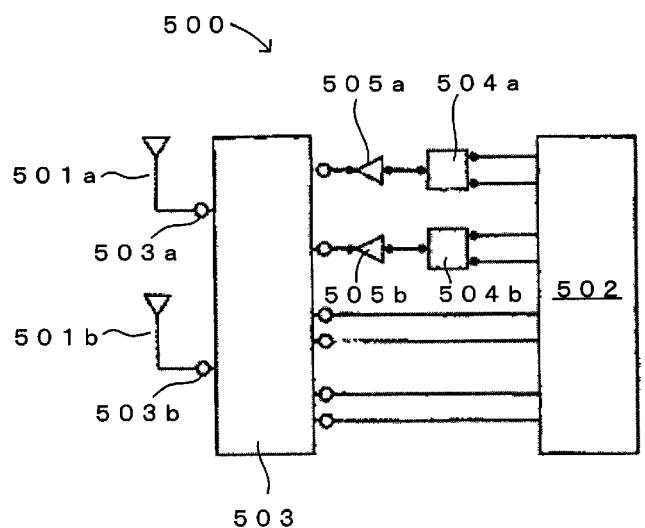
FIG. 13 is a diagram showing an example of a communication apparatus including an existing switch module.

A fifth preferred embodiment of the present invention will be described with reference to FIG. 12. FIG. 12 is a circuit block diagram of a switch module according to the fifth preferred embodiment of the present invention. The switch module 1 of the fifth preferred embodiment is different from the above-described fourth preferred embodiment in that, as shown in FIG. 12, two electrostatic protection sections 6a and 6b which are the second electrostatic protection sections shown in FIG. 10 are further provided corresponding to the antenna terminals ANT1 and ANT2, respectively. The other components are the same as those in the fourth preferred embodiment, thus such components are designated by the same reference signs, and the description thereof is omitted.

As described above, in the fifth preferred embodiment, it is possible to achieve the same advantageous effects as those in the above-described preferred embodiments.

The present invention is not limited to each preferred embodiment described above, and other than the above, various changes may be made without departing from the spirit of the invention. For example, although, in the above-described preferred embodiments, each of the switches 31a and 31b and 41a to 41h preferably includes a field effect transistor, each of the switches 31a and 31b and 41a to 41h may be configured as various switches each defined by a PIN diode, or may be configured as a switching element such as a bipolar transistor or an electrostatic induction type transistor, for example. In addition, the first and second switch units of various preferred embodiments of the present invention are not limited to be configured as the first and second switch ICs 3 and 4, and may be configured as appropriate in accordance with the configuration of the respective switches included in the first and second switch sections 31 and 41.

In addition, the respective antenna elements connected to the first switch unit (first switch IC 3) are not limited to the above-described multi-band antennas A1 and A2, and a plurality of single-band antennas corresponding to the respective bands used for communication of the respective communication systems connected to the second switch unit (second switch IC 4) may be connected to the first switch unit. Moreover, the number of the antenna elements connected to the first switch unit and the number of the communication systems connected to the second switch unit may be set to optimum numbers as appropriate in accordance with the configuration of the communication apparatus in which the switch module is mounted.

The electrostatic protection sections 6a, 6b, 7a, and 7b and the low pass filters LPF1 and LPF2 may be provided on a substrate of the communication apparatus in which the switch module is mounted. In addition, the low pass filter may be replaced with a circuit configuration such as a notch filter.

Various preferred embodiments of the present invention are widely applicable to a switch module which selectively connects a plurality of antenna elements and a plurality of communication systems.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A switch module comprising:
    a first switch unit including a first switch IC, a plurality of antenna terminals to which antenna elements are respectively connected, a first common terminal, and a first switch section which selectively connects any one of the plurality of antenna terminals and the first common terminal;
    a second switch unit including a second switch IC, a second common terminal, a plurality of signal terminals to which corresponding communication systems are respectively connected, and a second switch section which selectively connects the second common terminal and any one of the plurality of signal terminals;
    a signal line which connects the first common terminal and the second common terminal;
    a matching circuit provided on the signal line;
    a wiring board on which the first switch IC, the second switch IC, the signal line, and the matching circuit are provided;
    a first power supply terminal provided in the first switch IC;
    a second power supply terminal provided in the second switch IC;
    a common power supply electrode provided on the wiring board; and
    a power supply line provided on the wiring board and connecting the common power supply electrode, and the first power supply terminal and the second power supply terminal.

2. The switch module according to claim 1, further comprising an electrostatic protection section including an inductor provided corresponding to each of the antenna terminals; wherein
    each inductor is connected at one end thereof to the corresponding antenna terminal and is grounded at another end thereof.

3. The switch module according to claim 1, further comprising an electrostatic protection section including a capacitor provided corresponding to each of the antenna terminals, wherein
    each capacitor is connected at one end thereof to the corresponding antenna terminal and is connected at another end thereof to the antenna element connected to the antenna terminal.

4. The switch module according to claim 1, wherein the first switch section includes first switches provided corresponding to the antenna terminals, respectively, and each of the first switches is connected at one end thereof to the first common terminal and is connected at another end thereof to the corresponding antenna terminal; and
    the second switch section includes second switches provided corresponding to the signal terminals, respectively, and each of the second switches is connected at one end thereof to the second common terminal and is connected at another end thereof to the corresponding signal terminal.

5. The switch module according to claim 4, wherein each of the first switches and the second switches is formed of a field effect transistor.

6. The switch module according to claim 1, wherein the switch module is configured to operate in a plurality of communication systems which perform communication according to communication standards different from each other, and a plurality of communication systems which perform communication according to a same communication standard in different bands.

7. The switch module according to claim 1, wherein the first switch unit and the second switch unit include switches including an inductor, a capacitor, and a resistor connected to a field effect transistor.

8. The switch module according to claim 1, further comprising a low pass filter configured to attenuate harmonic components of communication signals outputted from a transmitting circuit section.

9. The switch module according to claim 8, wherein the low pass filter includes capacitors and inductors connected to define a filter circuit.

10. The switch module according to claim 9, wherein each of the inductors and the capacitors of the low pass filter include a stripline and a plate electrode provided on a wiring board.

11. The switch module according to claim 9, wherein each of the inductors and the capacitors of the low pass filter include a chip component provided on a wiring board.

12. The switch module according to claim 9, wherein the matching circuit includes inductors and capacitors.

13. The switch module according to claim 12, wherein the inductors of the matching circuit include stripline components and the capacitors of the matching circuit include plate electrodes.

14. The switch module according to claim 12, wherein the inductors and the capacitors of the matching circuit are chip components.

15. The switch module according to claim 1, wherein the matching circuit includes at least two matching circuits respectively connected to one of the plurality of antenna terminals.

16. The switch module according to claim 1, further comprising at least two electrostatic protection sections including capacitors corresponding to the antenna terminals.

17. The switch module according to claim 1, further comprising at least two electrostatic protection sections including inductors corresponding to the antenna terminals.

18. The switch module according to claim 1, further comprising a first electrostatic protection section and two second electrostatic protection sections.

\* \* \* \* \*